(12) United States Patent
Sjöö

(10) Patent No.: US 9,387,546 B2
(45) Date of Patent: Jul. 12, 2016

(54) MILLING TOOL

(71) Applicant: SANDVIK INTELLECTUAL PROPERTY AB, Sandviken (SE)

(72) Inventor: Sture Sjöö, Gävle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 351 days.

(21) Appl. No.: 13/890,436

(22) Filed: May 9, 2013

(65) Prior Publication Data

US 2013/0302098 A1 Nov. 14, 2013

(30) Foreign Application Priority Data

May 9, 2012 (SE) ....................................... 1250473

(51) Int. Cl.
*B23F 21/16* (2006.01)
*B23C 5/04* (2006.01)

(52) U.S. Cl.
CPC .................. *B23F 21/166* (2013.01); *B23C 5/04* (2013.01); *B23F 21/16* (2013.01); *B23C 2210/244* (2013.01); *B23C 2210/245* (2013.01); *Y10T 407/14* (2015.01)

(58) Field of Classification Search
CPC .............. B23F 5/24; B23F 9/08; B23F 9/082; B23F 9/088; B23F 9/086; B23F 11/00; B23F 21/12; B23F 21/16; B23F 21/163; B23F 21/166; B23F 3/1243; B23C 5/28; Y10T 407/17; Y10T 407/1715; Y10T 407/1725; Y10T 407/173; Y10T 407/1902

USPC ..................................... 407/20, 23, 25, 26, 31
See application file for complete search history.

(56) References Cited

U.S. PATENT DOCUMENTS

| 433,458 | A | * | 8/1890 | Eberhardt | 407/29 |
| 1,096,163 | A | * | 5/1914 | Fawcus | 407/26 |
| 1,432,580 | A | * | 10/1922 | Vauclain et al. | 407/31 |

(Continued)

FOREIGN PATENT DOCUMENTS

| DE | 7700367 U1 | 4/1978 |
| DE | 3104752 A1 | * 8/1982 |

(Continued)

OTHER PUBLICATIONS

English translation of DE 3104752 A1, Aug. 1982.*

*Primary Examiner* — Sunil K Singh
*Assistant Examiner* — Alan Snyder
(74) *Attorney, Agent, or Firm* — Corinne R. Gorski (57) ABSTRACT

A milling tool for hobbing a workpiece. The milling tool includes a cylindrical tool body having a rotation axis and a plurality of disc-shaped segments. Each of the segments including a hub part and a peripheral cam having a plurality of tangentially spaced-apart milling inserts. Each segment has a through hole situated on the rotation axis. Each of the holes is directed in relation to each other such that a central duct is formed in the cylindrical tool body. Bordering segments are detachably torsionally rigidly interconnected The milling tool also includes a first end piece, which on one side is detachably and torsionally rigidly interconnected with a first one of the segments and which on the other side has coupling members for torsionally rigid coupling to a source of torque, such that all torque from the source is supplied to the cylindrical tool body via the first end piece.

16 Claims, 10 Drawing Sheets

(56) References Cited

U.S. PATENT DOCUMENTS

| | | | |
|---|---|---|---|
| 4,218,159 A * | 8/1980 | Langen | 407/25 |
| 4,242,020 A * | 12/1980 | Schmid | 409/234 |
| 2003/0017013 A1* | 1/2003 | Soltau et al. | 407/30 |
| 2011/0103903 A1* | 5/2011 | Sture | 407/11 |
| 2012/0321397 A1* | 12/2012 | Sjoo | 407/29 |

FOREIGN PATENT DOCUMENTS

| DE | 102005029053 A1 | 1/2007 |
|---|---|---|
| DE | 102009016257 A1 | 6/2010 |

* cited by examiner

MILLING TOOL

RELATED APPLICATION DATA

This application claims priority under 35 U.S.C. §119 to Swedish Patent Application No. 1250473-4, filed on May 9, 2012, which the entirety thereof is incorporated herein by reference.

FIELD OF THE INVENTION

The present invention concerns a milling tool formed for the hobbing of a workpiece having cogs, such as cogwheels, racks, and the like.

BACKGROUND OF THE INVENTION

Milling tools for hobbing are often provided as integral tools wherein the milling inserts are placed along a helical line along a cylindrical tool body. In the manufacture of such tools, there may occasionally be problems of gaining access to machine seats for the milling inserts or the milling inserts themselves in those cases they are integrated in the tool body. This depends on the fact that it occasionally is narrow between axially consecutive revolutions of the helical line of milling inserts. This is a reason for milling tools for hobbing also being provided in the form of tools wherein the cylindrical tool body is composed of a plurality of disc-shaped segments, each segment usually embracing one turn of milling inserts in the helical line.

A plurality of different such embodiments of segment hobs are previously known. In DE 10 2005 029053 A1, a segment hob is disclosed that comprises a cylindrical tool body, which is composed of a plurality of separate segments. The separate segments are rotationally secured in relation to each other by means of loose, separate fitting bolts. In each end, there is an end piece, and the entire package of segments and end pieces is kept together by long, through screws. Centrally through all segments, a drive shaft extends, which in its one end is coupled to a machine tool, which is maneuverable to rotate the drive shaft. For the transfer of torque from the drive shaft to the tool, a wedge is countersunk in a groove on the drive shaft and is in engagement with internal grooves in the different segments.

A problem of this previously known segment hob is that the machining precision of the generated surfaces in the workpiece does not become sufficiently high for certain applications.

SUMMARY OF THE INVENTION

Therefore, the object of the present invention is to entirely or partly obviate the above mentioned problems. According to the invention, this object is achieved by means of a milling tool according to claim 1. Advantageous embodiments are seen in the dependent claims.

A milling tool according to the invention, which is formed for the hobbing of a workpiece having cogs, such as cogwheels, racks, and the like, comprises a cylindrical tool body, which defines a rotation axis and comprises a plurality of disc-shaped segments. Each one of the segments includes a hub part and a peripheral cam for a plurality of tangentially spaced-apart milling inserts, wherein bordering segments are detachably interconnected. Each segment has a through hole situated on the rotation axis, which holes are directed in such a way in relation to each other that a central duct is formed in the cylindrical tool body. Bordering segments are torsionally rigidly interconnected. The milling tool comprises furthermore a first end piece, which on its one side is detachably and torsionally rigidly interconnected with a first one of the segments and which on its other side has coupling members for torsionally rigid coupling to a source of torque in such a way that all torque from the source is supplied to the cylindrical tool body via the first end piece. The central duct is a cooling medium duct.

The invention is based on the idea that the above mentioned object can be achieved by a milling tool wherein the torque from the source is transferred to the segments with very small play. In known devices wherein the torque is supplied to each individual segment via a central drive shaft coupled to the tool spindle, there is most often a play between the segments and the drive shaft to allow the segments to be threaded onto the drive shaft in the mounting of the milling tool. This also applies to the fit between the wedge on the shaft and the groove that is present in each segment. Therefore, such known tools have often a radial slack between the drive shaft and the central hole in the segments as well as a tangential slack between the wedge of the shaft and the corresponding groove on the segments. These slacks may cause problems of vibrations that adversely affect the machining precision of the workpiece.

Thanks to bordering segments being torsionally rigidly interconnected and the invention comprising a first end piece, which on its one side is torsionally rigidly coupled to a first one of the segments and on its other side is torsionally rigidly coupleable to a tool spindle, torque, or in other words rotation, can be transferred from the tool spindle to the segments with considerably less play than in the described known technique. This also means that the through-going drive shaft of previously known milling tools can be spared. Instead, the central duct, which extends through the segments and which the drive shaft should have filled up, can be used for cooling medium. This allows efficient internal cooling of the milling tool so that the milling tool becomes less sensitive to dimensional changes caused by temperature fluctuations. Thus, the milling tool according to the invention is less inclined to vibrate and can keep a more constant dimension than tools of the previously known described kind, which provides the desired improved machining precision.

The milling tool according to the invention is suitable for chip removing machining of workpieces of metal, such as steel, cast iron, aluminium, titanium, yellow metals, etc.

The milling tool according to the invention is formed for the milling of cogs in a workpiece, particularly by hobbing. Usually, a cylindrical workpiece is started from, around the periphery of which spaces are milled in such a way that the remaining material forms cogs. Also other forms of workpieces are naturally feasible, such as racks. Thus, the milling tool according to the invention would also be usable in a similar method for the milling of racks.

The milling tool according to the invention comprises a plurality of disc-shaped segments, which are joinable into a cylindrical tool body. With cylindrical tool body, reference is made to the fact that the radially outmost points of the segments are situated on the envelope surface of an imaginary cylinder. Usually, there is a space between radially outer parts of the segments so that the external surface of the tool body in itself does not follow the envelope surface of a cylinder.

Each segment comprises a hub part and a peripheral cam situated radially outside the hub part. In the cam, a plurality of tangentially, or in other words, circumferentially, separated milling inserts are arranged. The milling inserts may be formed integrally with the cam, machined from the same component as the cam, or be permanently arranged in the cam, for example by soldering or the like. In other embodiments, the cam may comprise seats for replaceable milling inserts. The replaceable milling inserts may be of any suitable type, for example of a hard material, such as cemented carbide, cermet, ceramics, or the like. The milling inserts may be attached to the cam in any suitable way, for instance by means of a fixing screw or a tightening element. The milling inserts may comprise one or more cutting edges, wherein they may be indexable and/or invertible.

The peripheral cam may extend one turn around the hub part, and usually the same, or the milling inserts arranged therein, follows a helical line of a certain pitch. The pitch of the cam may be constant and the same in all segments, or vary. However, it is also possible with embodiments wherein the cam does not extend a whole turn, but just a part, so that a complete turn extends across several consecutive interconnected segments. For certain applications, it is possible to use embodiments wherein the cam has a pitch of 0°, such as in duplex or triplex slit cutting for internal cogwheels, or wherein the cam extends intermittently along the periphery of the segment.

According to the invention, bordering segments are torsionally rigidly interconnected. Thus, adjacent segments are mutually prevented from rotating in relation to each other. The segments may be detachably interconnected in any suitable way, for example by means of screws, bolts, and nuts, or by means of locking coupling details, for example of the male-female type. The coupling details may be locking thanks to their geometrical shape and/or thanks to friction between them. Usually, the segments are detachably interconnected in such a way that they are immovable in relation to each other also in the axial and radial direction, or in other words in all directions.

The milling tool according to the invention comprises a first end piece, which on its one side is detachably and torsionally rigidly interconnected with a first one of the segments and which on its other side has coupling members for torsionally rigid coupling to a source of torque.

Usually, the end piece is a disc-shaped element, but it may also have a longer axial extension, for example be cylindrical with a circular cross-section. It may have a suitable diameter, for example the same diameter as the segments or the same diameter as the hub part of the segments. An advantage of the end piece having the same diameter as the hub part is that the contact surface between the end piece and the first segment can be made as large as possible, which contributes to a safer coupling. However, also other axial cross-sections are possible, for example a square, polygonal or another suitable cross-section.

The end piece is on its one side coupleable to a source of torque, usually a tool spindle of a machine tool. On its other side, the end piece has coupling members for the interconnection with a closest bordering segment. Coupling members for said purpose may be permanently attached to or integrated in the end piece, or loose coupling members may be used for the coupling of the end piece to the source of torque. The coupling members may be locking thanks to their geometrical shape and/or thanks to friction. Usually, the end piece is detachably interconnectable with the source and interconnected with a segment, respectively, in such a way that it is immovable in relation to the source/segment also in the axial and radial direction, or in other words in all directions. The coupling members on both sides of the end piece may be of the same or different types. According to one embodiment, the coupling members are of the same type as those used for the interconnection of the segments. Advantageously, this implies that the coupling between all interconnected parts of the milling tool has the same properties, which contributes to decreasing the emergence of vibrations in the milling tool as well as to a simpler manufacture. According to one embodiment, the coupling member on both sides of the end piece is of the same type so far that the geometrical shape of a cross-section is the same. The coupling member for the coupling to a tool spindle may, however, differ from the coupling member for the coupling of the first end piece to a segment concerning dimension, cone angle, and/or the size/presence of through hole/holes.

According to the invention, the cylindrical tool body is supplied with all torque from the source via the first end piece. It is the torque from the source that brings the tool body to rotate. Within the scope of the invention, it is, however, possible to supply the tool body with torque from other sources in another way. The individual segments of the tool body are mutually torsionally rigidly interconnected so that the torque transfer from the machine tool can be effected via an end piece to all segments.

Thereby, the milling tool lacks a through-going drive shaft that in conventional milling tools extends through all segments for the supply of torque (rotation) to each one of these. Instead, the milling tool according to the invention has a central duct that extends through all segments. In each segment, the duct is formed by central, through holes situated on the rotation axis. This empty space forms a cooling medium duct. As cooling medium, any suitable material may be used, for example a gas or a liquid such as air, water or oil.

The duct may be a closed room wherein the cooling medium stands still or is circulating. It is also possible to couple the duct to an external source of cooling medium and allow cooling medium flowing in and out through the duct continuously or according to needs.

According to one embodiment of the milling tool according to the invention, each segment comprises a branch duct for the supply of cooling medium from the central cooling medium duct to milling inserts of the peripheral cam. In this way, it is advantageously achieved that the tool body can cooled from within across a greater area. Furthermore, the milling inserts can be cooled more efficiently and the quantity of cooling medium needed is smaller than in conventional cooling from outside. This makes the milling tool according to said embodiment even more insensitive to dimensional changes caused by temperature fluctuations. Furthermore, chips can be flushed away in a more efficient way.

According to one embodiment of the milling tool according to the invention, the milling tool furthermore comprises a second end piece. The second end piece is on its one side detachably and torsionally rigidly interconnected with a last one of the segments and has on its other side bearing members for rotatable bearing in a support. Thanks to said second end piece, the milling tool according to the invention may easily be mounted in a machine tool, the first end piece being coupled to the spindle of the machine and the second end piece to the support side of the machine. According to one embodiment, the second end piece is of the same type as the first one and differs from the same only in its protruding coupling member. However, in certain applications, it is possible to dimension at least certain parts of the second end piece smaller, for example with a smaller diameter. This is possible since the second end piece in its capacity as supporting end is less loaded than the first end piece in its capacity as driving end.

According to one embodiment of the milling tool according to the invention, bordering segments are interconnected by means of a respective one of male and female members co-operating in pairs, the male and female members being situated in such a way that the rotation axis extends through the male and female members. The central cooling medium duct extends through the male and female members along its extension in the cylindrical tool body. Thanks to the segments being interconnected in pairs by means of only each a co-operating male and female member, the problems of complicated and inexact fit, which occasionally may be found in embodiments wherein a plurality of through screws are used, are avoided. In this connection, the hollow design of the male and female members facilitates the central placement of the cooling medium duct.

In embodiments having two end pieces, advantageously also the end pieces and the respective closest bordering segments are interconnected by means of a respective one of said male and female members co-operating in pairs. Advantageously, this implies that the coupling between all interconnected parts of the milling tool has the same properties, which contributes to decreasing the emergence of vibrations in the milling tool as well as to a simpler manufacture. If using coupling members with good properties regarding axial and radial play between the interconnected components, also advantageously good properties of the entire tool are obtained if the same kind of coupling members is used for the interconnection of all components of the tool. In this connection, the coupling members may be of the same type so far that they essentially have the same geometrical shape or cross-section, but they may differ concerning, for example, dimension, angles and/or the internal design of the male members.

According to one embodiment, on one hand, the coupling members of the end piece for the interconnection with the segments are of the same type as the coupling members between the segments, and on the other hand, the coupling members for the interconnection with the source of torque are of a standard design for tools intended to be coupled to the source in question. This embodiment is advantageous since the end piece then can act as an adapter between the tool body and the source.

According to one embodiment, the hub part comprises two opposite plane-parallel end surfaces, and the first end piece and the second end piece comprise each a plane-parallel end surface facing the respective bordering segment, which end surfaces extend perpendicular to the rotation axis. Furthermore, the male and female members include each a contact surface, which converges from a large end toward a small end and which in a cross-section across the rotation axis forms an out-of-round curve. The contact surfaces of the male and female members are dimensioned so that they, when the male and female members are being brought together, direct their two bordering segments toward an end position that is centred and mutually angularly determined by the out-of-round cross-section curve around the rotation axis and where the plane-parallel end surfaces abut against each other.

When a male member is being mated with a female member in this embodiment, there is initially a radial gap between the contact surface of the male member and the female member by virtue of the conicity and mutual dimensions of the contact surfaces. When the male and female members have been brought together a partial distance, the contact surfaces will contact each other, the contact usually being in point form, line form, or in subareas of the contact surfaces. Upon continued bringing together, at least fractions of the contact surfaces slide against each other. In doing so, the segments, and an end piece, respectively, are brought to rotate toward a position angularly determined by the out-of-round cross-section. Thanks to the male and female members being placed around the rotation axis of the tool body, they have in addition the ability to direct the segments radially to a position in which they are mutually centred on the rotation axis. The male and female members are brought together into an axial end position that is determined by plane-parallel end surfaces at the hub part of the bordering segments and the end pieces, respectively, meeting each other. Also in this end position, usually only fractions of the contact surfaces have contact with each other.

Thus, by means of the male and female members formed and placed in this embodiment of the invention in combination with the plane-parallel end surfaces, a very exact mutual placement of the bordering segments, the end pieces, and an end piece in relation to the source of torque is advantageously provided in all directions, viz. in the angular direction, the radial direction, and the axial direction. In other words, an utmost exact spatial positioning of the milling inserts included in the tool is provided. This entails a very high positioning reliability, which contributes to high dimensional accuracy of the tool. In such a way, good machining results in the form of smooth and dimensionally accurate flank surfaces of those cogs that are provided between the gashes cut out by the milling inserts are guaranteed. Furthermore, a simple mounting and dismounting is also advantageously obtained thanks to only one co-operating male and female member per pair of segments being needed.

According to one embodiment of the invention, the male and female members are integrated with their segments. The concept "integrated", such as this is used in the present application, should be interpreted in a wide sense. In a standard embodiment, the individual segment may be manufactured by the machining of a single solid workpiece, e.g., of steel. However, it is also feasible to initially permanently unite two (or more) components of the same or different materials and make the final, shape-determining machining not until in a concluding step. The integration of the connection means in the proper segments gives good possibilities to make the same with high precision and dimensional accuracy.

BRIEF DESCRIPTION OF THE DRAWING

In the following, the invention will be described in more detail by means of embodiment examples and reference being made to the accompanying, schematic drawing. In the different embodiments, the same reference designations are used for equal or corresponding components.

DESCRIPTION OF PREFERRED EMBODIMENTS

Figure 1:
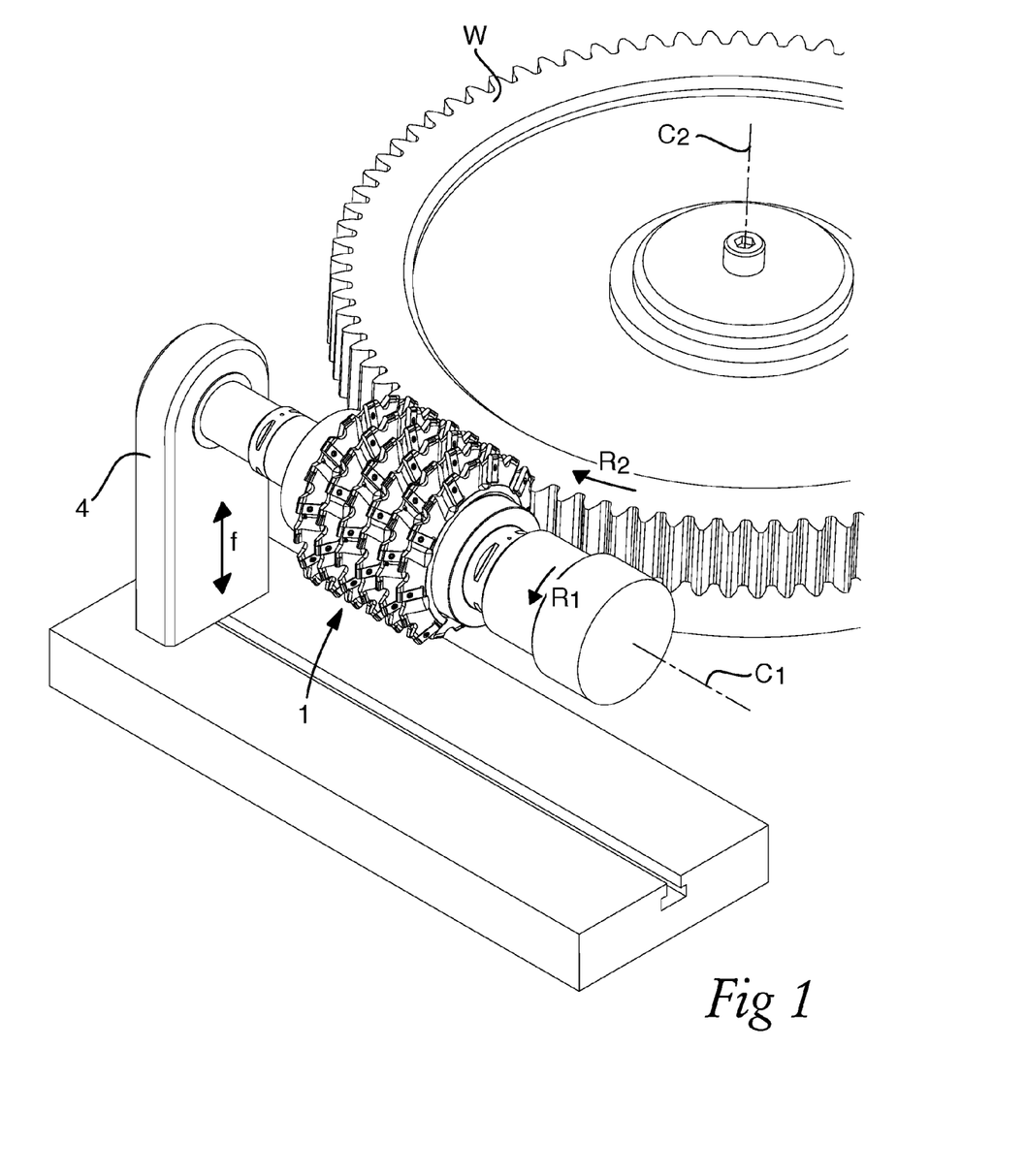
FIG. 1 is a view in perspective of an embodiment of the milling tool according to the invention when it is coupled in a machine tool during the milling of a cogwheel.

In FIG. 1, there is schematically shown a milling tool 1 made in accordance with an embodiment the invention during the machining of a workpiece W with the purpose of forming a cogwheel (for the sake of clarity, the cogs and the cut-out gashes are shown in a finish-machined state). In other words, the invention is exemplified in the form of a segment hob.

In the shown use of the milling tool 1 according to this embodiment, a second end of the tool 1 is rotatably journalled in a support in the form of a bearing bracket 4. The first end is coupleable to a chuck or the like in a machine tool (not shown). In the figure, the coupling of said end is shown schematically. In practice, it is formed to fit a suitable coupling interface in the machine tool in question.

The machine tool acts as source of torque and transfers rotation to the tool 1, which will be explained in more detail below. Thereby, the tool 1 is rotatable on an axis C1 in the direction R1 at the same time as the workpiece W is turnable or rotatable in the direction R2, more precisely on a centre axis C2. Usually, the milling tool is driven at a considerably higher speed than the workpiece. For instance, the tool may be rotated 100 revolutions, while the workpiece is turned 1 revolution. The feeding of the tool is made parallel to the centre axis C2, as outlined by means of the double arrow "f". By the selected directions of rotation R1, R2, the feeding takes place in the downward direction from an upper end position.

Figure 2:
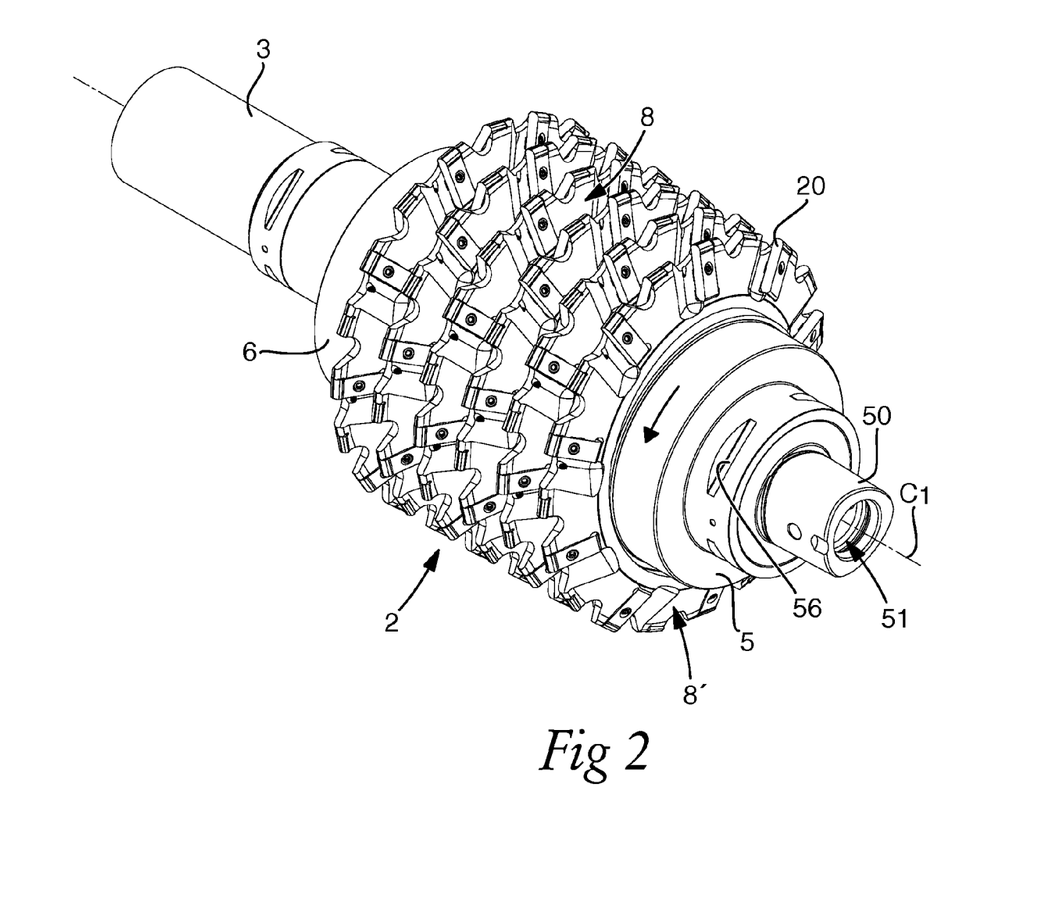
FIG. 2 is a view in perspective of the milling tool according to FIG. 1 in an assembled state.

In FIG. 2, the milling tool 1 is shown in its entirety in more detail. A plurality of segments 8, which are included in the tool 1, form together a cylindrical milling, or basic, body 2, the individual milling inserts 20, which are included in the segments 8, following a continuous helical line along the outside of the cylinder. The segments 8 are placed between a pair of end pieces, a first one of which is designated 5 and the second one 6. In the embodiment illustrated, the coupling member of the first end piece 5 for the coupling to a tool spindle is in the form of a part of a so-called COROMANT CAPTO® coupling, which often is included in tools from SANDVIK COROMANT AB. The second end piece 6 is coupled to a neck 3 for rotatable bearing in a machine tool. In FIG. 2, there is also seen a cooling duct 51 situated centrally on the rotation axis C1.

Figure 3:
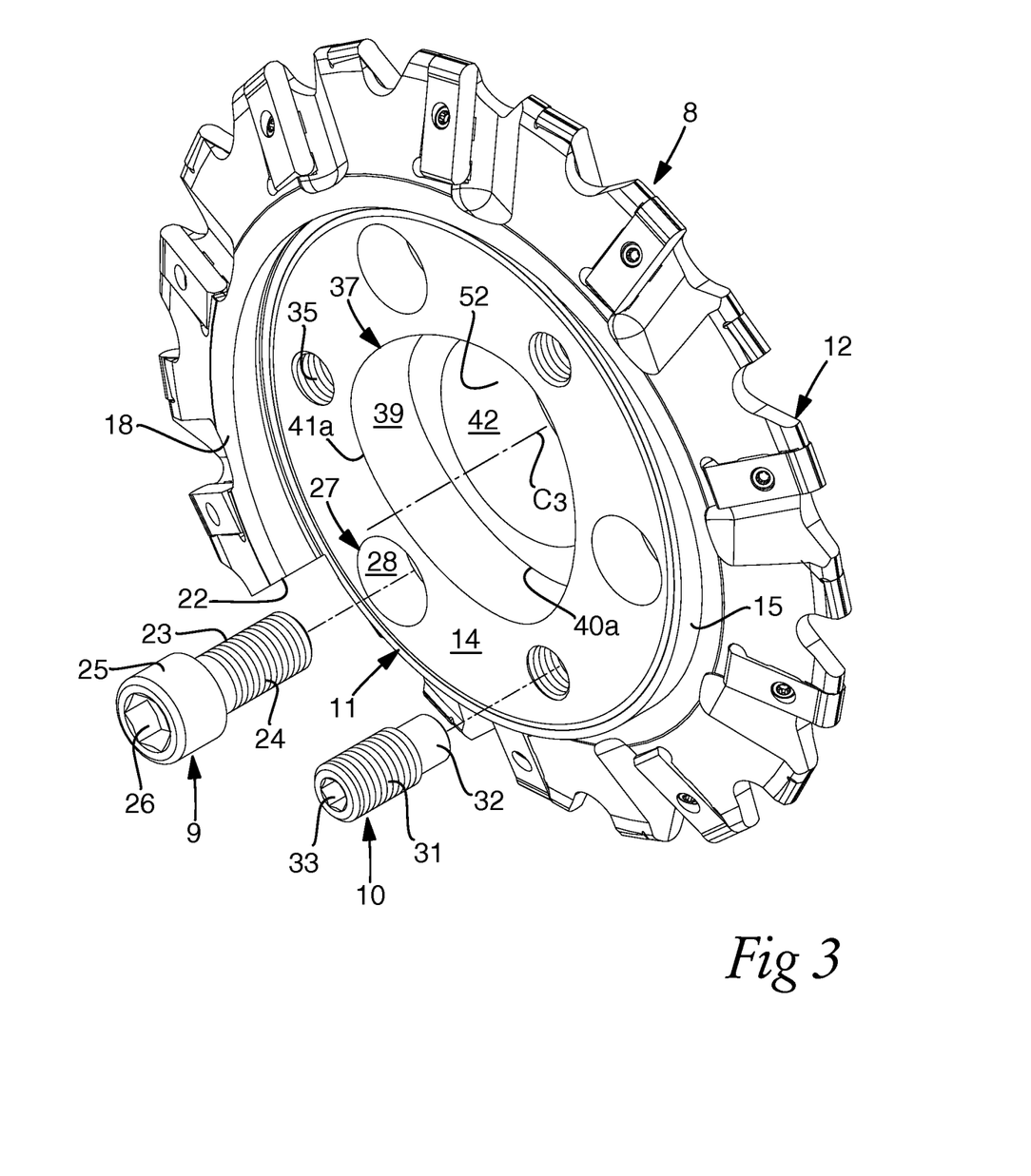
FIG. 3 is a view in perspective of a segment included in the milling tool according to FIG. 2.
Figure 4:
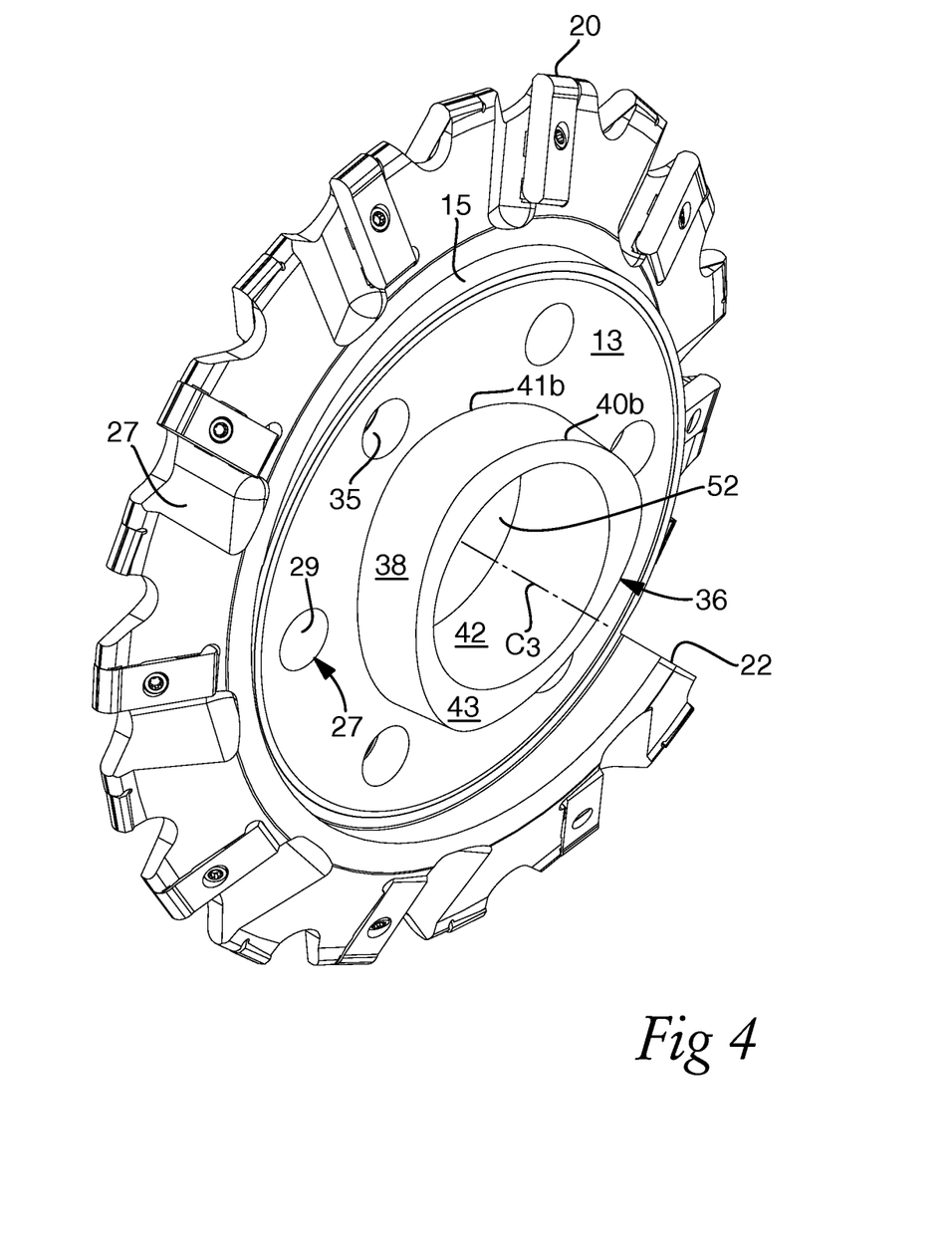
FIG. 4 is a view in perspective from the other side of the same segment that is shown in FIG. 3.

In the following, with reference to FIGS. 3-6, the segments included in this embodiment of the invention will be described. In the embodiment illustrated, bordering segments 8 are interconnected by means of each a coupling member, situated centrally on the rotation axis C1 and the cooling duct 51. A coupling member of male type projects from one side of each segment and a coupling member of female type extends into each segment on the other side thereof. In FIG. 3, two types of screws are also shown, viz. a draw-in bolt 9 and a disassembly screw 10, which are used in the mounting and dismounting, respectively, of the segments 8, which will be explained in more detail below.

Each segment includes a hub part 11 and a peripheral cam 12 situated radially outward from the same. The hub part 11 includes two plane and parallel end surfaces 13, 14 (see FIG. 5).

Figure 5:
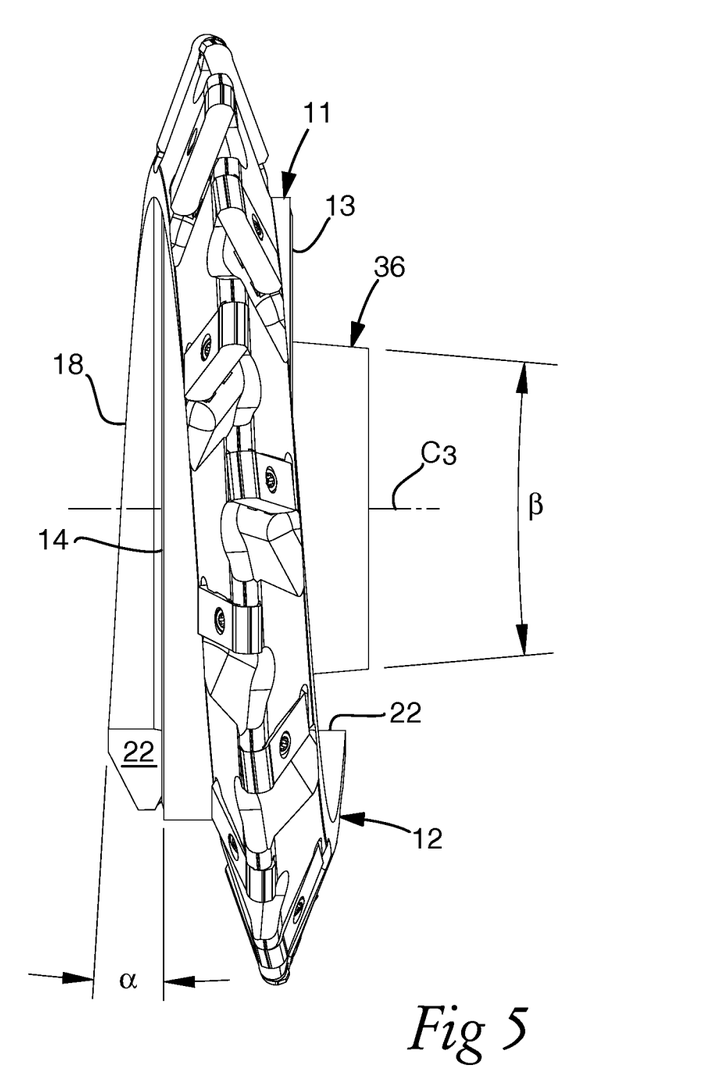
FIG. 5 is a side view of the same segment that is shown in FIGS. 3 and 4.

The two end surfaces 13, 14 extend in planes perpendicular to a centre axis C3, which in the mounted state of the tool 1 coincides with the rotation axis C1 of the assembled tool. In other words, the end surfaces 13, 14 are mutually parallel. Outward, the hub part 11 is limited by a partially cylindrical envelope surface 15. The envelope surface 15 is concentric with the axis C3.

Radially outside the envelope surface 15 of the hub part 11, a peripheral cam 12 extends, which has a certain radial extension. The peripheral cam 12 extends one turn along the hub part 11 and follows a helical line of a predetermined pitch. This pitch is indicated by the angle α between the plane end surface 13 of the hub part and a ring-shaped front surface 18 of the cam 12 (see FIG. 5). α is suitably within the range of 1-10°. The cam 12 is cross-sectionally wedge-shaped in such a way that it tapers from a wide base toward a pointed outer portion, see also FIGS. 10 and 12. The cam 12 ends and begins in plane surfaces 22, which can be pressed against analogous surfaces of the cams in neighbouring segments. Together, the cams of the individual segments thus form a continuous, thread-like screw formation of the assembled tool.

In the opposite, inclined flank surfaces of the cam, a plurality of seats are recessed for replaceable milling inserts 20. In the example shown, the milling inserts are of cemented carbide and attached in the seat in a conventional way so that they abut against support surfaces by means of a screw. The seats are separated tangentially, or in other words, circumferentially.

Rotationally in front of each seat and milling insert 20, there is a chip channel 21 to facilitate the evacuation of the chips that are removed by means of the milling inserts 20. Every second seat and milling insert 20, respectively, are present in one flank surface of the cam 12 and every second in the other flank surface.

In the embodiment illustrated of the invention, the segments are rotationally secured in relation to each other by means of coupling means in the form of male and female members 36, 37 co-operating in pairs, which are integrated with the individual segments. Each male and female member includes a contact surface 38 and 39, respectively, which has an out-of-round cross-sectional shape as viewed in a plane perpendicular to the centre axis C3. Furthermore, the contact surface converges from a big end toward a small end. In the example, each segment includes, on one hand, a male member 36, which projects axially from one end surface 13 of the segment, and, on the other hand, a female member in the form of a recess 37, which mouths in the other end surface 14 of the hub part 11. The small end of the female member is represented by an endless boundary line 40a and the large end by a likewise endless boundary line 41a. In an analogous way, the boundary line 41b represents the large end of the male member 36, while the small end is represented by the boundary line 40b. In other words, the contact surfaces 38, 39 converge in one and the same direction, viz. from the support end of the milling tool to the spindle end thereof.

In the example shown, the male and female members are situated centred on the centre axis C3. However, in other embodiments of the invention, it is possible to arrange the male and female members so that the centre axis C3, which normally is the same as the rotation axis C1 of the tool, extends through the male and female member displaced in some direction. The central location around the centre axis of the male and female members gives advantageously a simpler design of the geometries of the male and female members. The centred location also allows smaller male and female members, which advantageously implies stiffer segments.

In the example, the out-of-round cross-sectional shape of the male and female members has been realized by the same having been made polygonal, more precisely trigonal or three-cornered. In brief terms, the shape is determined by a curve having three round corners, which protrude from an inscribed circle that is tangent to three curved arc lines having a greater radius of curvature than the radius of curvature of the corners (see FIG. 6).

Figure 6:
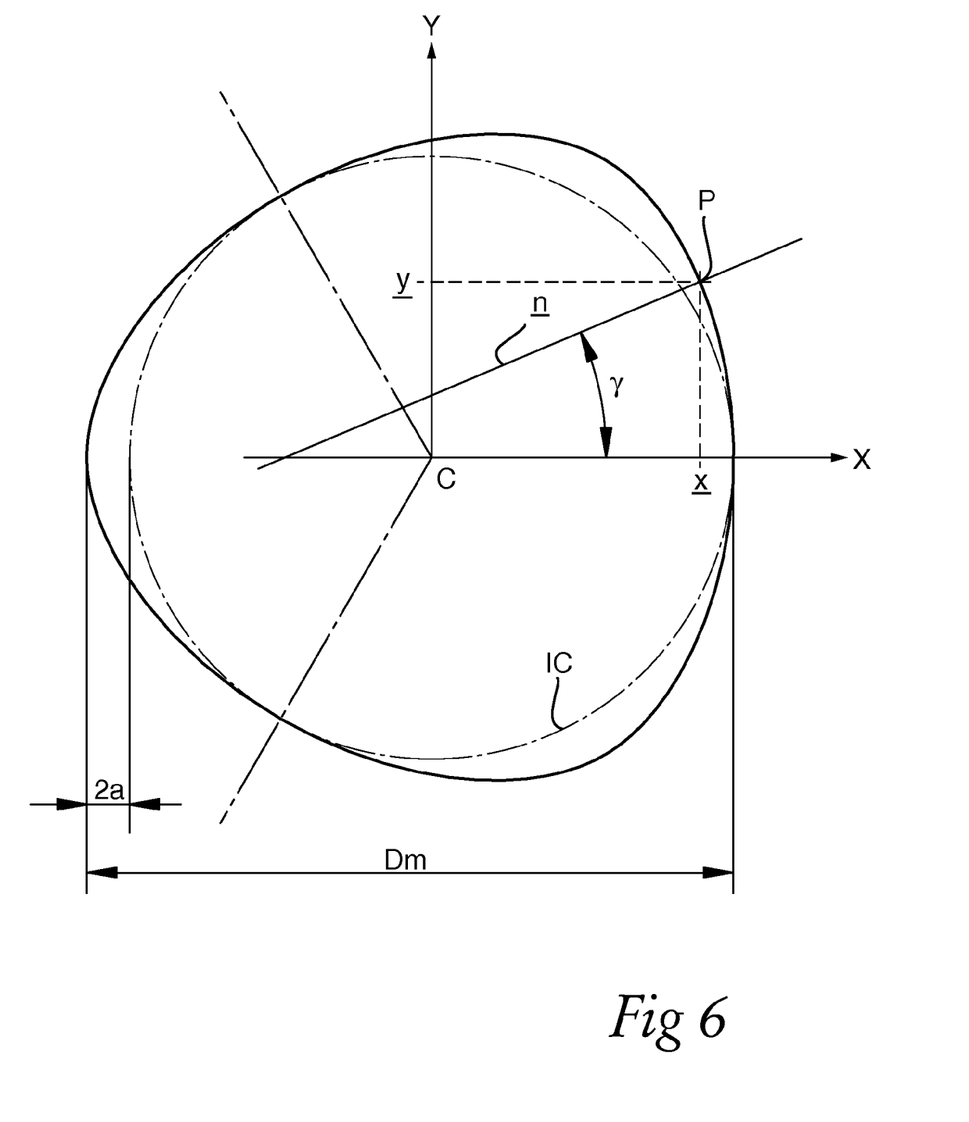
FIG. 6 is a geometrical picture illustrating a cross-sectional shape of an embodiment of the co-operating male and female members of the tool.

Geometrically, this curve is defined by the formulas:

$$x = \left(\frac{D_m}{2}\right) \cdot \cos(\gamma) - 2 \cdot a \cdot \cos(2\gamma) + a \cdot \cos(4\gamma)$$

$$y = \left(\frac{D_m}{2}\right) \cdot \sin(\gamma) + 2 \cdot a \cdot \sin(2\gamma) + a \cdot \sin(4\gamma)$$

wherein:

n=a normal to the curve in an arbitrary point P, x and y=co-ordinates of a traditional system of co-ordinates, γ=the angle between the normal n and the x-axis of the system of co-ordinates, 2a=the selected eccentricity (or bulging) of an individual corner in relation to the inscribed circle IC, and Dm=the sum of the diameter of the inscribed circle and the eccentricity 2a.

Male- and female-shaped couplings having said trigonal cross-sectional shape are per se previously known and used in tools for cutting machining. In commercial use, the couplings in question are denominated COROMANT CAPTO® and are often included in tools from SANDVIK COROMANT AB. The male and female members of the segments may, however, differ concerning dimension, cone angle, and/or concerning the through hole from male and female, respectively, members manufactured according to existing standard for COROMANT CAPTO®.

The angle of convergence β (see FIG. 5) of the two contact surfaces 38, 39 should amount to at least 2° and at most 20° (β/2=1° and 10°, respectively). Suitably, the angle of convergence is within the range of 6-14°. In the example shown, arbitrary generatrices along the respective contact surface are straight. When the angles of convergence are moderate (by being within the above-mentioned interval), the engagement between the male and female members becomes self-locking so far that the members only by great difficulty (=great force) can be separated. On the other hand, too great angles of convergence outside the interval make more difficult the inventive desired guidance toward the spatially determined end position.

In the embodiment of the invention shown, the contact surfaces 38, 39 of the male and female members are finished into a very high dimensional accuracy, more precisely a dimensional accuracy that suitably is finer than 0.01 mm. This may advantageously be effected by so-called adaptive-controlled machining, preferably in the form of milling by means of a shank-end mill. Such machining is made in several consecutive steps after the workpiece has been formed with a material allowance of approx. 0.3 mm. After a first reduction of said material allowance, there is made a measuring of the tolerances before further material is removed in at least one further step. In this way, the contact surfaces can all-round be given a dimensional accuracy of all the way down to 0.001 mm.

The male member 36 is hollow or tubular and the interior hole thereof connects to the female member 37 on the opposite side of the segment. Thus, a through hole 52 situated centrally on the centre axis C3 is formed. The internal surface 42 of the male member 36 is cylindrical. The cylinder surface 42 and the external contact surface 38 connect to a common ring surface 43, which forms the free end of the male member 36.

Figure 7:
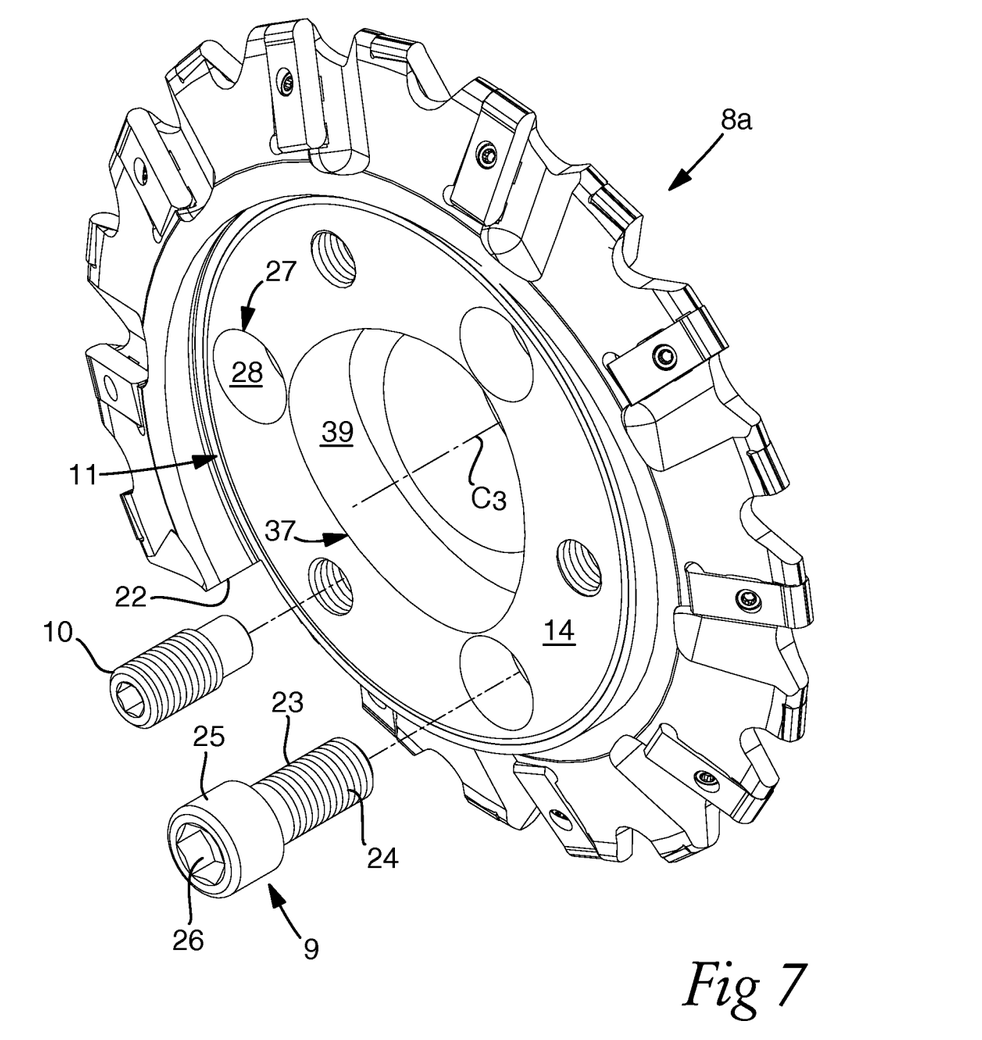
FIG. 7 is a perspective view corresponding to the one in FIG. 3 of another type of segments included in one embodiment of the tool, which segments are alternately inserted between the segments of the first type.

In the embodiment illustrated, as has been mentioned above, two types of screws are used in the mounting and dismounting, respectively, of the segments 8. For this purpose, each segment is provided with a number of threaded holes 35 and a number of unthreaded bores 27. Furthermore, two different basic types of segments 8 are used, which in the assembled tool are arranged alternately, or in other words, every second segment is of the first type and every second segment is of the second type. The two types of the segments differ from each other only in that the hole patterns in the respective segment types are displaced in relation to each other. This is seen in a comparison between FIG. 3 and FIG. 7, FIG. 3 showing a segment 8 of the first type and FIG. 7 a segment 8a of the second type. Thus, in the segment 8 according to FIG. 3, a bore 27 is situated at the plane surface 22 of the cam 12, while in the segment 8a according to FIG. 7, on the other hand a threaded hole 35 is situated in the corresponding position. In the assembled tool, where said two different segment types 8, 8a are arranged alternately, a threaded hole 35 and a through bore 27 are furthermore situated alternately and in line with each other.

Figure 8:
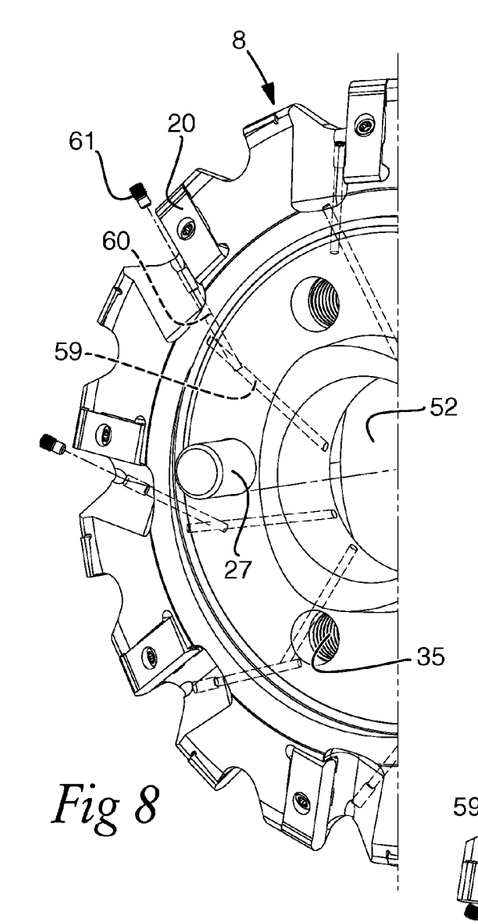
FIG. 8 is a perspective view of a segment included in a second embodiment of the milling tool according to the invention.
Figure 9:
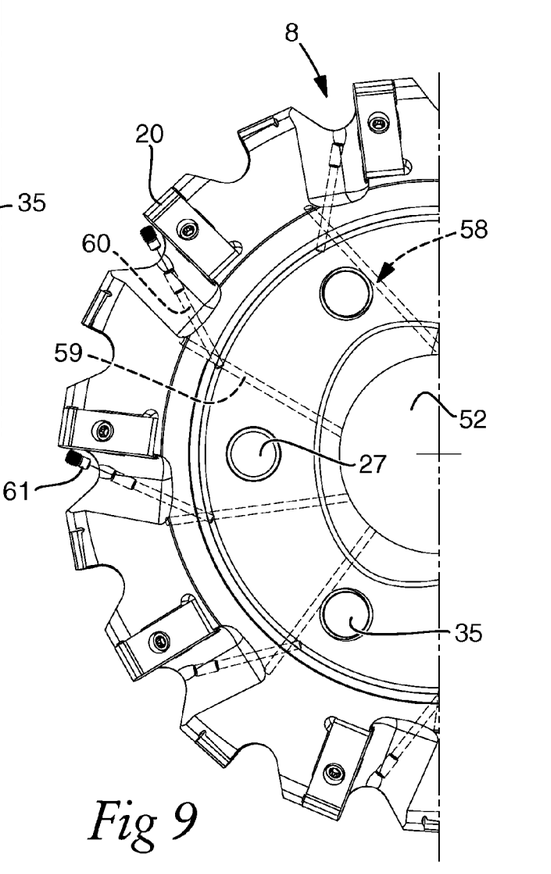
FIG. 9 is a planar view of the same segment as in FIG. 8, FIG. 10 a longitudinal section through two segments connected with each other according to FIGS. 3 and 8.

In a second embodiment of the milling tool, the segments 8, 8a are provided with branch ducts 58. Such segments that are included in the second embodiment are shown in FIGS. 8 and 9. A branch duct extends from the through hole 52 of the segment, which in the assembled state of the tool forms the central cooling medium duct 51, outward toward the peripheral cam 12 and mouths at a seat for a milling insert 20. In the embodiment illustrated, the branch ducts 58 mouths in the chip channels 21, which, as seen in the direction of rotation, are situated in front of each seat.

In the shown, second embodiment, each branch duct 58 is formed as two straight subducts. The inner subduct extends from the central hole 51 outward through the hub part 11 between the screw holes 35 and the bores 27 toward the cam 12 and mouths at a point in the chip channel 21. This point is selected in such a way that it is possible to drill straight in from said point toward the central hole without intersecting any threaded hole 35 or bore 27. The outer part of the inner subduct 59 is plugged up for the prevention of leakage of the cooling medium to be used.

The other, outer subduct 60 extends straight from the position in chip space 21 in question where supply of cooling medium is desired to the cutting process inward toward a suitable point of the inner branch duct 59. Thus, it is possible to drill also the outer branch duct 60 straight and in one step.

Together, the two subducts 59, 60 form a connection duct in the form of a branch duct 58 from the central hole 52 of the segment to a point in each chip space, which in the process is suitable for the supply of cooling medium. The mouth of the outer subduct 60 is provided with a nozzle.

In the embodiment illustrated, a branch duct 58 leads to every second chip channel 21. Other embodiments may have another number of branch ducts depending on size, geometry and possible extensions between borings for the mutual interconnection of the segments. For example, an outer branch duct 60 may mouth in each chip channel, the mouth facing the milling insert. It is also possible that two outer branch ducts from different chip channels transform into the same inner branch duct 58.

For allowing use of the segments included in the second embodiment of the milling tool according to the invention in a process where it is enough with internal cooling and where cooling in each chip space is not desired, the outer subduct 60 can be plugged up by means of a detachable plug 61.

The milling tool according to the shown embodiment comprises furthermore, as has been mentioned above, a first end piece 5, see FIGS. 11 and 12. In the embodiment illustrated, the first end piece is a rotationally symmetrical element and comprises three portions axially arranged one after the other, which are integratedly formed and in one and the same piece of material, viz. an inner coupling portion 53, a gripper groove portion 54 and an outer coupling portion 55.

Figure 11:
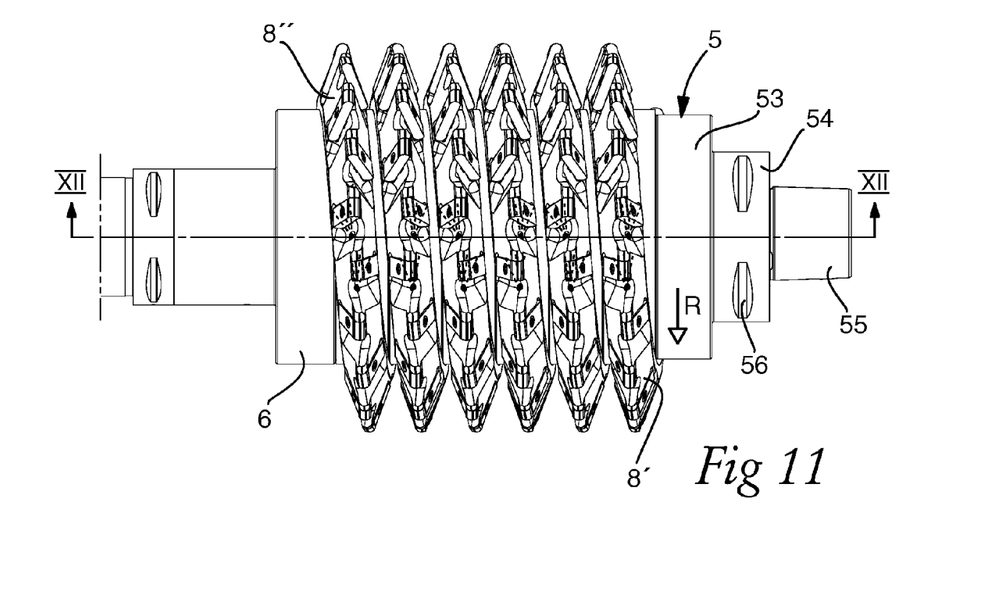
FIG. 11 is a perspective view of the milling tool according to the second embodiment in an assembled state.
Figure 12:
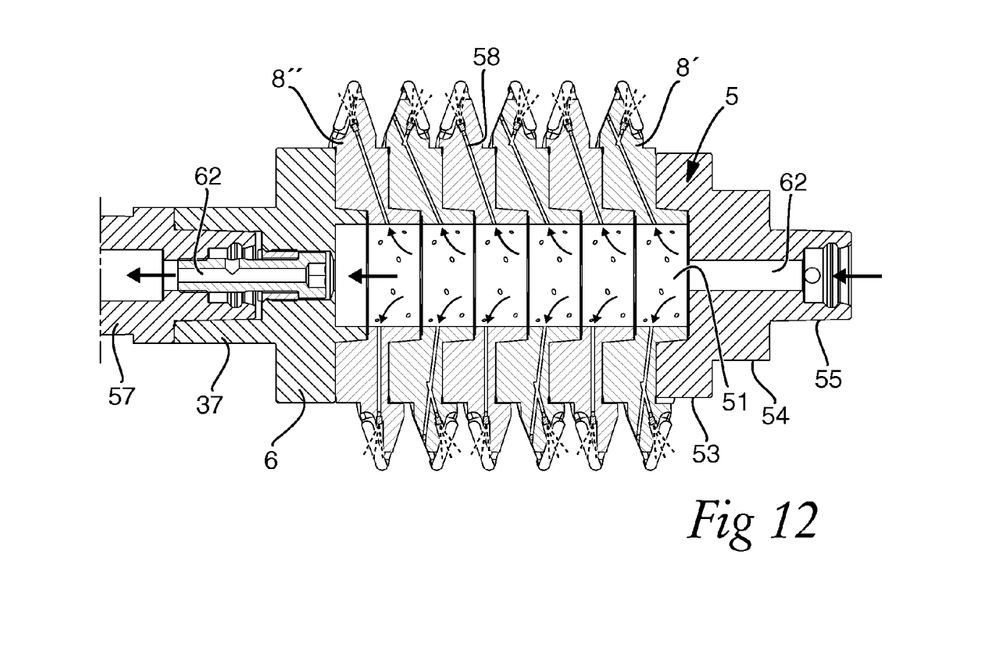
FIG. 12 is a longitudinal section through the milling tool according to FIG. 11.

On its one, inner side, the first end piece 5 is detachably and torsionally rigidly interconnected with a first 8' one of the segments 8. For this purpose, the first end piece 5 comprises coupling members in the form of a female member 37 of the same type as the segments 8 comprise and which has been described in more detail above. This female member is arranged in the inner coupling portion 53 of the end piece. The inner coupling portion 53 has a disc shape and the greatest diameter of the three portions, which diameter is the same as the hub part of the segments has.

Closest axially outward after the inner coupling portion 53, as seen from the segments of the tool, the gripper groove portion 54 of the first end piece 5 follows. Also this portion has a disc shape, but the diameter thereof is smaller than the one of the inner coupling portion 53. On the outside of the cylindrical envelope surface of the gripper groove portion 54, notches 56 for the co-operation with a tool changer are arranged.

Closest axially outward after the gripper groove portion, as seen from the segments of the tool, the outer coupling portion 55 of the first end piece 5 follows. The outer coupling portion 55 comprises coupling members for torsionally rigid coupling to a source of torque, e.g., a tool spindle, in the form of a male member of the same type as the segments 8 comprise and which has been described in more detail above. The male member of the outer coupling portion is accordingly of the same type as the male members 36 of the segments 8. The male member of the outer coupling portion is of the same type as the male members of the segments so far that the geometrical shape of a cross-section is the same. A male member for the coupling to a tool spindle compared with a male member for the interconnection of segments or for the coupling of the first end piece to a segment, may, however, differ concerning dimension, cone angle, and/or size of through holes.

The first end piece 5 includes three threaded holes 35, but no smooth bores, not shown.

Through the first end piece 5, a connection duct 62 extends.

The milling tool according to the shown embodiment comprises furthermore, as has been mentioned above, a second end piece 6. The second end piece 6 is a disc-shaped element from one side, the inner one, of which a coupling member for detachable and torsionally rigid interconnection with a last one of the segments 8" projects. According to the shown embodiment, said coupling member is a male member 36 of the same type as the segments 8 comprise and which has been described in more detail above.

A second coupling member is situated on the other, outer side of the second end piece 6. In the embodiment illustrated, this second coupling member is a female member 37 of the same type as the segments 8 comprise and which has been described in more detail above. The female member 37 is situated in a sleeve-like portion that projects from the disc-shaped second end piece 6.

Via its female member, the second end piece is coupled to a neck 57. Through the second end piece 6, a connection duct 62 extends.

In the second end piece 6, in total six holes are included, viz. three threaded holes 35 and three smooth bores 27 of the same type as in the segments 8, 8a (not shown).

For the mounting of a milling tool according to the embodiments described, a plurality of draw-in bolts 9 are used, see FIGS. 3 and 7. Each such screw includes a shank 23 having a male thread 24 as well as a head 25 having a greater diameter than the shank. In this head, a key grip 26 is formed for, for instance, a hex head wrench.

For each segment, three draw-in bolts 9 are advantageously used, which are applicable in through holes or bores 27 in the hub part 11. These bores are smooth so far that they lack threads. Each bore is formed with a countersink 28 that is intended for the screw head 25 and has an enlarged diameter. More precisely, the wide countersink 28 mouths in the front end surface 14 of the hub part, while a narrower section 29 (see FIGS. 5 and 8) mouths in the rear end surface 13 of the hub part. By the fact that the front and rear sections of the bore 27 have different diameters, a ring-shaped shoulder 30 is formed, against which the screw head 25 can be pressed. The three bores 27 are equidistantly separated, i.e., have an angular pitch of 120°.

The disassembly screw 10 lacks head and includes a front male thread 31 as well as a rear cylindrical portion 32, the diameter of which is smaller than the outer diameter of the male thread. More precisely, the cylinder portion 32 has such a small diameter that the same can be introduced into the key grip 26 of a draw-in bolt 9. It should also be noted that the dismounting screw 10 includes a key grip 33 in its front end.

Axially through the hub part 11, three additional holes 35 extend, which, in contrast to the smooth bores 27, include a thread in the form of a female thread 35 (see FIG. 7). The male threads 23, 31 of the respective screws 9, 10 are similar, so that they individually can be secured in the holes 35 (however not simultaneously). Also the three threaded holes 35 are mutually equidistantly separated, i.e., have an angular pitch of 120°. Furthermore, the holes 35 are located halfway between two neighbouring bores 27, implying that the angular pitch between each individual bore 27 and two neighbouring, threaded holes 35 amounts to 60°.

Thanks to the spatial locations of the segments being determined by the male and female members in combination with the plane-parallel end surfaces, the tolerances of the smooth bores and the threaded holes are high. Their alignment with each other is not critical to the mutual location of the segments. A purpose of the screws 9 is to press together the set of segments 8 so that male and female members are brought together until opposite end surfaces 13, 14 are pressed in pairs into close contact with each other. Thus, the screws 9 remain in the assembled tool. The compressing force of the screws advantageously makes the connection between the individual segments extra stiff.

In other embodiments of the invention, the screws can be unscrewed again after the segments of the set having reached their respective end positions. It is also possible to press together the segments in another way than by means of screws, for example by means of an outer clamp or the like.

The disassembly screws 10 are not included in the described embodiment in the assembled tool, but will not be of use until in connection with possible dismounting of the tool, when one or more segments are to be separated from each other.

Mounting of the different components into an assembled tool may be made in the following way.

In a first step, the male member 36 on a first segment 8' of the type 8 is brought into engagement with the female member 37 in the first end piece 5, besides which three headed screws 9 are put through the three bores 27 in the segment and are tightened in the threaded holes 35 in the end piece. In such a way, the segment can be pressed by great force against the end piece 5, so that the rear end surface 13 thereof is pressed in close contact with the front surface of the end piece 5.

In a second step, the male member 36 on a segment of the type 8a is brought into engagement with the forward opening female member 37 in the first segment of the type 8, after which the segments are pressed into close contact with each other by means of three screws 9. In this connection, each screw is put through a bore 27 in the segment 8a and is fastened in a threaded hole 35 situated in line with the same in the segment 8. Next, this procedure is repeated until the desired number of segments has been connected with each other. In a concluding step, three screws 9 are brought to fix the second end piece 6 against the last segment 8".

Figure 10:
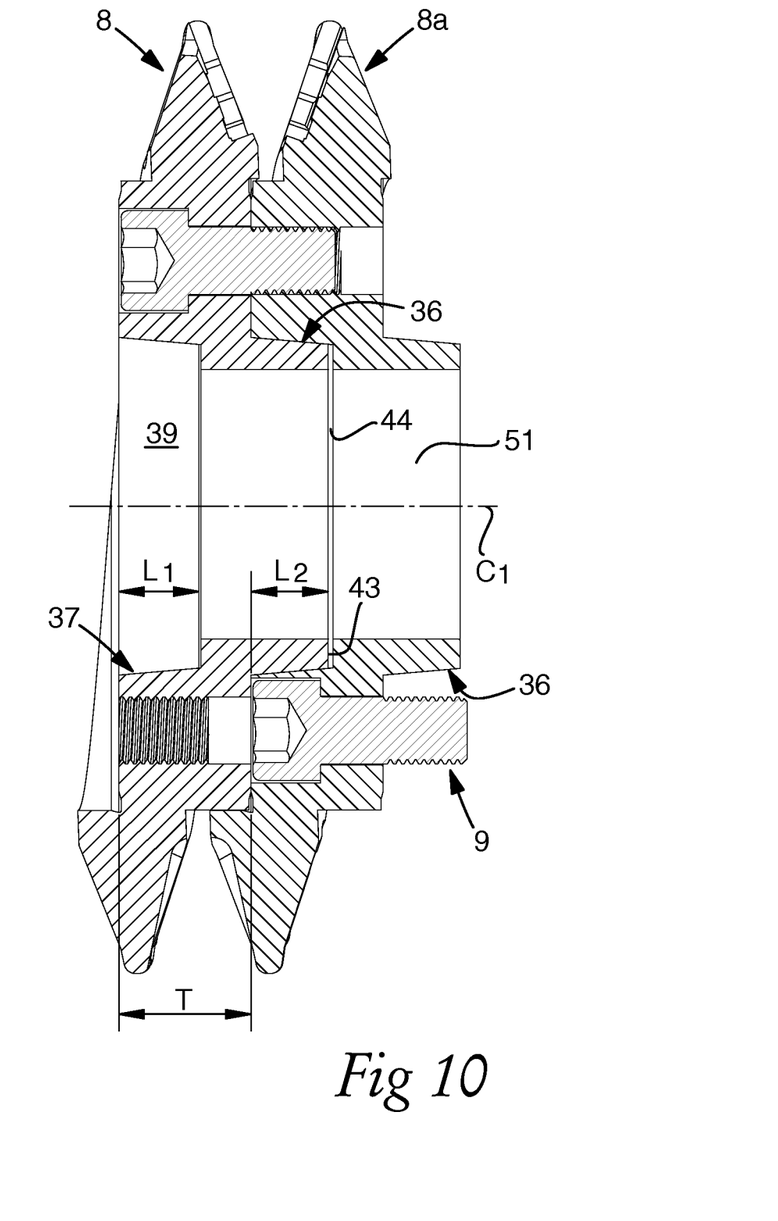

In FIG. 10, two adjacent segments of a milling tool according to the first embodiment are shown in an assembled state. T designates the thickness of the individual segment, such as this is determined by the axial distance between the end surfaces 13 and 14. This measure coincides moreover with the pitch of the cam 12. The depth of the recess 37 is designated L1, while the axial length of the male member 36 is designated L2. L1 should amount to at least 30% and at most 80% of T. Preferably, L1 is within the interval of 50-70% of T. L1 is smaller than L2. When the male member 36 engages the appurtenant recess in the assembled state of the tool, there is a gap 44 between the free end 43 of the male member and the bottom of the recess. In other words, the male member does not touch the bottom in the recess. In this way, it is advantageously guaranteed that the desired axial end position according to the invention, in which the plane-parallel surfaces of two bordering segments abut against each other, is reached without being obstructed by the male and female members. However, apart from the small gap 44, it is, in the described embodiment, the hollow male members that form the central cooling duct 51.

Finally, the assembled milling tool can be mounted in a machine tool. In the embodiment illustrated, the machine has a coupling interface in the form of the so-called COROMANT CAPTO® described above. The male member of the first end piece of COROMANT CAPTO®-type can then be coupled to the tool spindle of the machine, where appropriate by means of a tool changer that engages the notches of the gripper groove portion 54 of the end piece. The other end of the tool is placed with the neck of the second end piece 6 resting in the bearing bracket of the machine tool. In doing so, the rotation axis (C1, C3) extends through the male and female members as well as the neck.

When the machine tool is driven to rotate, it acts as a source of torque. The torque is supplied to the first end piece via the tool spindle, which is enabled by the torsionally rigid coupling between them. Thanks to the first segment 8' being torsionally rigidly coupled to the first end piece 5 and each subsequent segment 8, 8a being torsionally rigidly coupled to the one next in front, the torque of the tool spindle is transferred to all segments of the tool so that the tool is brought to rotate. Thereby, all torque from the source is accordingly supplied to the cylindrical tool body via the first end piece.

In this connection, the torsionally rigid and coupling between the segments mutually, and between the end pieces and the respective segment, guarantees, thanks to a small slack and play in the coupling, a vibrationally insensitive rotation of the tool.

Furthermore, the different segments form together a cylindrical body of a very high stiffness, implying that the spatial locations of the different milling inserts will be determined very accurately. The result of this will be that the flank surfaces of those cogs that are to be created in the workpiece W obtain very good tolerances. The exact dimensions of the tool can be held in spite of temperature differences caused by the machining process or by other things, thanks to the central cooling duct. The effect may be further improved in embodiments having branch ducts 58 that extend through the segments.

Possible dismounting of the tool, for instance with the purpose of replacing a damaged segment, can be effected by means of the dismounting screws 10. First, however, the screws 9 visible in the presently outermost segment, for example a last segment 8", are unscrewed. Then, the disassembly screws are screwed into threaded holes 35 in an outermost segment, for example a last segment 8". In doing so, they will be pressed against the draw-in bolts 9 in the segment behind. More precisely, the cylinder portion 32 of the individual screw will be pressed against the bottom in the key grip 26 of the screw head. By tightening the three screws 10 approximately uniformly, it is guaranteed that the male member of the end piece 6 is reliably removed exactly axially out of the female member in the segment 8a. In further steps, the different segments can be separated from each other in the same way by means of three simultaneously active dismounting screws 10.

The invention claimed is:

1. A milling tool for the hobbing of a workpiece having cogs, such as cogwheels, and racks, comprising:
    a cylindrical tool body, which defines a rotation axis and including a plurality of disc-shaped segments, each of the plurality of segments including a hub part and a peripheral cam having a plurality of tangentially spaced-apart milling inserts, bordering segments being detachably and torsionally rigidly interconnected, wherein each of the plurality of segments has a through hole situated on the rotation axis, which holes are directed in such a way in relation to each other that a central duct is formed in the cylindrical tool body, the central duct being a cooling medium duct; and
    a first end piece having opposed sides, one side being detachably and torsionally rigidly interconnected with a first one of the plurality of segments, and the other side having coupling members for torsionally rigid coupling to a source of torque in such a way that all torque from the source is supplied to the cylindrical tool body via only the first end piece.

2. A milling tool for the hobbing of a workpiece having cogs, such as cogwheels, and racks comprising:
    a cylindrical tool body, which defines a rotation axis and including a plurality of disc-shaped segments, each of the plurality of segments including a hub part and a peripheral cam having a plurality of tangentially spaced-apart milling inserts bordering segments being detachably and torsionally rigidly interconnected, wherein each of the plurality of segments has a through hole situated on the rotation axis, which holes are directed in such a way in relation to each other that a central duct is formed in the cylindrical tool body; and
    a first end piece having opposed sides, one side being detachably and torsionally rigidly interconnected with a first one of the plurality of segments, and the other side having coupling members for torsionally rigid coupling to a source of torque in such a way that all torque from the source is supplied to the cylindrical tool body via only the first end piece, the central duct being a cooling medium duct, wherein the bordering segments are interconnected by a respective one of male and female members co-operating in pairs, the male and female members being situated so that the rotation axis extends through the male and female members, and the central cooling medium duct extends through the male and female members along an extension thereof in the cylindrical tool body.

3. A milling tool according to claim 2, wherein the first end piece and the first one of the plurality of segments are interconnected by a respective one of said male and female members co-operating in pairs, and the coupling member of the first end piece is a male member of the same type, the male and female members being situated so that the rotation axis extends through the male and female members.

4. A milling tool according to claim 3, further comprising a second end piece having opposed sides, one side being detachably and torsionally rigidly interconnected with a last one of the plurality of segments and the other side having bearing members for rotatable bearing in a support, the second end piece and the last segment being interconnected by a respective one of said male and female members co-operating in pairs, the male and female members as well as the bearing member being situated so that the rotation axis extends through the male and female members as well as the bearing member.

5. A milling tool according to claim 4, wherein the bearing member includes a neck locatable in a neck bearing of the support.

6. A milling tool according to claim 2, wherein the hub part includes two opposite plane-parallel end surfaces, the first end piece and the second end piece each having a plane-parallel end surface facing the respective bordering segment, each plane-parallel end surface extending perpendicular to the rotation axis, and wherein each of the male and female members include a contact surface, which converges from a large end toward a small end and which in a cross-section across the rotation axis forms an out-of-round curve, each contact surface of the male and female members being dimensioned to, when the male and female members are brought together, direct the two bordering segments thereof toward an end position that is centred and mutually angularly determined by the out-of-round cross-section curve around the rotation axis where the plane-parallel end surfaces abut against each other.

7. A milling tool according to claim 6, wherein the contact surface of the male member has a radial excess dimension in relation to the contact surface of the female member so that in the assembled state of the tool, the contact surface of the female member abuts with pressure against the contact surface of the male member.

8. A milling tool according to claim 6, wherein in the assembled state of the tool there is a gap disposed between the small end of the male member and the small end of the female member.

9. A milling tool according to claim 6, wherein each individual contact surface of the male and female members converges at an angle of convergence from at least 2° and at most 20°.

10. A milling tool according to claim 6, wherein each individual contact surface has a trigonal cross-sectional shape, which is defined by the following formulas:

$$x = \left(\frac{D_m}{2}\right) \cdot \cos(\gamma) - 2 \cdot a \cdot \cos(2\gamma) + a \cdot \cos(4\gamma)$$
$$y = \left(\frac{D_m}{2}\right) \cdot \sin(\gamma) + 2 \cdot a \cdot \sin(2\gamma) + a \cdot \sin(4\gamma)$$

wherein:
n=a normal to the curve in an arbitrary point P,
x and y=co-ordinates of a traditional system of co-ordinates,
γ=the angle between the normal n and the x-axis of the system of co-ordinates,
2a=the selected eccentricity (or bulging) of an individual corner in relation to an inscribed circle IC, and
$D_m$=the sum of the diameter of the inscribed circle and the eccentricity 2a.

11. A milling tool according to claim 1, wherein pairs of neighbouring segments are axially compressed by a plurality of draw-in bolts, each of the bolts including a head and a shank that is formed with a male thread, the shank extending through a bore in one of the segments and being tightenable by the male thread in a threaded hole in another segment.

12. A milling tool according to claim 4, wherein the male and female members are integrated with their segments and end pieces, respectively.

13. A milling tool according to claim 1, wherein an individual segment is formed with a male member that projects axially from an end surface and a recess forming a female member located in another end surface.

14. A milling tool according to claim 1, wherein each segment includes a branch duct for the supply of cooling medium from the central cooling medium duct to milling inserts disposed in the peripheral cam.

15. A milling tool according to claim 14, wherein the branch ducts includes at least one inner boring that extends radially from the central cooling medium duct to a chip channel located in the peripheral cam.

16. A milling tool according to claim 4, wherein each of the first end piece and the second end piece include a connection duct for the supply to and removal of cooling medium from the central cooling medium duct.

* * * * *